United States Patent [19]

Komura

[11] Patent Number: 5,396,801
[45] Date of Patent: Mar. 14, 1995

[54] VIBROMETER

[75] Inventor: Hidemichi Komura, Tokyo, Japan

[73] Assignee: Rion Kabushiki Kaisya, Kokubunji, Japan

[21] Appl. No.: 149,617

[22] Filed: Nov. 9, 1993

[30] Foreign Application Priority Data

Nov. 13, 1992 [JP] Japan .................................. 4-328728

[51] Int. Cl.⁶ ............................................ G01M 7/00
[52] U.S. Cl. ............................................................ 73/662
[58] Field of Search ................. 73/662, 622, 609, 614, 73/625

[56] References Cited

U.S. PATENT DOCUMENTS

3,868,847 3/1975 Gunkel .................................. 73/622

Primary Examiner—Hezron E. Williams
Assistant Examiner—Christine K. Oda
Attorney, Agent, or Firm—William S. Frommer; Alvin Sinderbrand

[57] ABSTRACT

A hand-held vibrometer for measuring vibration at a surface of a vibrating object includes plural vibration sensors, each of which has a respective axis of measurement. The vibration sensors are mounted on a rigid body so that the respective axes of measurement of the sensors intersect at a contact point on the rigid body, which contact point is to be applied to the vibrating object. The contact point is at a central axis of the rigid body and the respective axes of measurement of the vibration sensors all intersect the central axis of the rigid body at the same angle. Respective amounts of vibration in the vibrating object in three orthogonal measurement axes are calculated on the basis of output signals provided from the plurality of vibration sensors. The above-described arrangement of the vibration sensors increases the contact resonance frequency, and consequently the measurement range, of the vibrometer.

12 Claims, 8 Drawing Sheets

VIBROMETER

BACKGROUND OF THE INVENTION

1. Field of the Invention

This invention relates to a vibrometer, and more particularly, is suitable for a vibrometer used by hand-holding on the vibrating surface of object to be measured, out of vibrometers in which the vibrating quantity of the operating plant is measured for security and failure check. The vibrometer of this invention is also suitable for accelerometers out of vibrometers containing an accelerometer, a speedometer and a displacement meter. Therefore, the accelerometer (vibrometer) will be mainly described below.

2. Description of the Related Art

Heretofore, the vibrometer is classified in accordance with the direction of measurement into a uniaxial vibrometer having one axis of measurement, and a three-axial vibrometer having axes of measurement in three directions, etc.

Besides, in accordance with the method of use, the vibrometer is classified into a fixed type of the vibrometer which is screwed or bonded on the vibrating surface of the object to be measured and a hand-hold type of the vibrometer which is hand-held by operator on the vibrating surface of the object to be measured.

In these vibrometers generally, the measurement area which can be used the vibrometer is mostly determined on the basis of the spring constant (hereinafter, referred to as "contact spring constant") and the mass of a vibration sensor, the contact spring constant existing between the contact surface (or the hand-held portion) facing on the surface the vibration of which is measured of the vibrometer and the vibration measurement surface.

Figure 1:
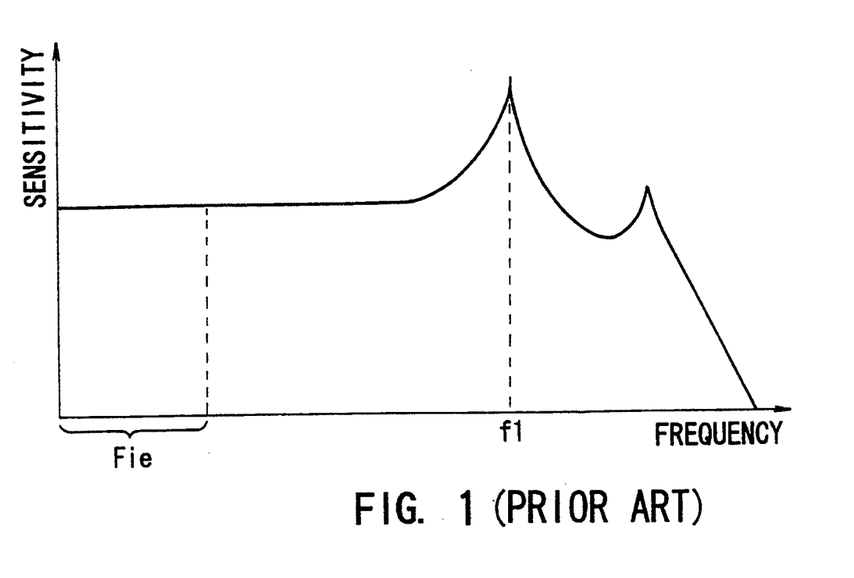
FIG. 1 is a characteristic curve diagram for explanation of the relationship between the sensibility of the acceleration sensor and the vibration frequency.

Specifically, the relation (hereinafter, referred to as "frequency characteristic") between the vibration on the surface the vibration of which is measured and the sensitivity of the vibration sensor is shown as a graph in FIG. 1 when sensitivity is represented in the axis of ordinates and the frequency of the surface the vibration of which is measured is represented in the axis of abscissas. In measuring vibration, the frequency area Fie, which is generated according to the contact spring constant and the mass of vibration sensor and which is approximately less than ⅓ of the resonance frequency f1 (hereinafter, referred to as "contact resonance frequency") between the vibrometer and the surface the vibration of which is measured, is generally used as a measurement data.

Figure 2A:
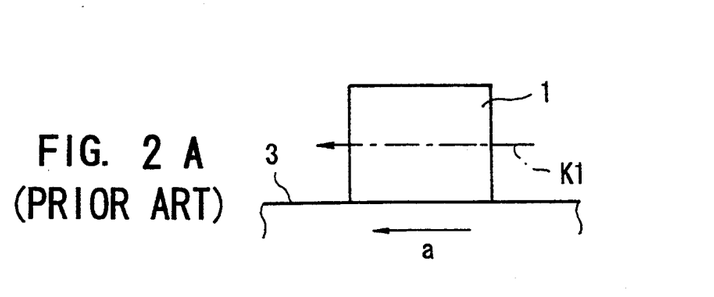
FIGS. 2A and 2B are plane views for explanation of the difference of the contact resonance frequency due to the difference of the vibrating direction and the direction of the axis of measurement of the vibration sensor.
Figure 2B:
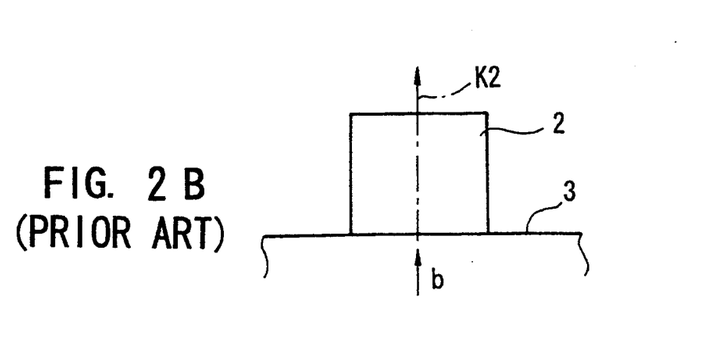
Figure 3:
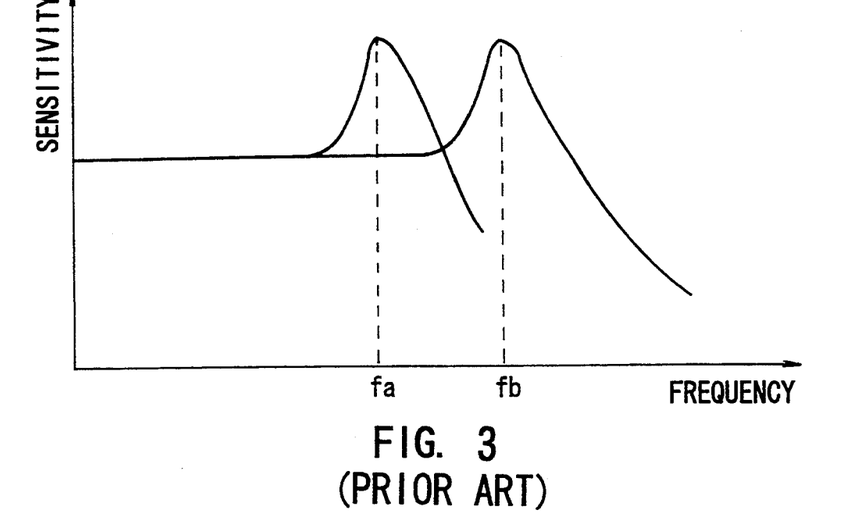
FIG. 3 is a characteristic curve diagram for explanation of the difference of the contact resonance frequency due to the difference of the vibrating direction and the direction of the axis of measurement of the vibration sensor.

In this case, if the vibration sensors 1 and 2 shown in FIGS. 2A and 2B are equalized regarding respective mass, sensitivity, and the contact area, comparing the frequency characteristic, in the case that the vibrating direction is parallel to the surface 3 the vibration of which is measured as shown by the arrow "a" in FIG. 2A and the axis of measurement K1 of the vibration sensor 1 set on the surface 3 is parallel to the surface 3, and the frequency characteristic, in the case that the vibrating direction is perpendicular to the surface 3 the vibration of which is measured as shown by the arrow "b" in FIG. 2B and the axis of measurement K2 of the vibration sensor 2 set on said surface 3 is perpendicular to the surface 3, as shown in FIG. 3, the contact resonance frequency fa in the case of FIG. 2A becomes lower than the contact resonance frequency fb in the case of FIG. 2B.

As described above, because the contact spring constant between the vibration sensor 1 and the surface 3 the vibration of which is measured and the contact spring constant between the vibration sensor 2 and the surface 3 differ in accordance with the vibrating directions, the difference between the contact resonance frequencies fa and fb occurs depending on the direction of the surface 3 the vibration of which is measured, and the direction of the axis of measurement K1 or K2 of the vibration sensor 1 or 2 set on said surface 3. In the vibration sensor, the contact spring constant, in the case that the axis of measurement is perpendicular to the surface 3 and the vibrating direction of the object the vibration of which is measured is perpendicular to the surface 3, is generally larger than the contact spring constant, in the case that the axis of measurement is parallel to the surface 3 and the vibrating direction of the object the vibration of which is being measured is parallel to the surface 3.

Further, in the vibrometer, the fixed type of the vibrometer is fixed on the object the vibration of which is measured for the surface. On the contrary, the hand-hold type of vibrometer is formed into spherical shape of 3 to 10 [mm] in the end of probe so as to contact with the surface the vibration of which is measured nearly by the dot contact, and the hand-held force is usually used on the order of 1 to 2 [Kgf]. Therefore, the hand-held type of vibrometer has a problem that the contact spring constant is low since the area contacted on the surface the vibration of which is measured is smaller than that of the fixed type, so that the contact resonance frequency is small.

However, the hand-held type of vibrometer can easily measure the quantity of vibration only by hand-holding the vibrometer on the surface the vibration of which is measured. Thus, for example, in the case when a lot of points to be measured are measured continuously, the hand-held type of vibrometer can perform easier and more effective measurement than the fixed type. Therefore, the hand-held type of vibrometer is suitable for the case where the quantity of vibration of the operating plant is measured for the purpose of security and failure check.

Heretofore, in such measurement, the quantity of vibration of the direction which is perpendicular to the surface of the object the vibration of which is measured (hereinafter, this direction is called "Z-axis direction"), and the quantity of vibration of two directions which are parallel to said surface and are perpendicular to each other (hereinafter, these directions are called "X-axis direction" and "Y-axis direction" respectively), are measured, and then the vibration state of the object the vibration of which is measured has been analyzed three-dimensionally based on the measured result.

As the method for detecting in this case, generally, there is a method that three uniaxial vibrometers are fixed or hand-held on one point on the surface which orthogonalize with X-axis direction, one point on the surface which orthogonalize with Y-axis direction and X-axis direction.

However, the detection efficiency is low in this detecting method, and moreover the points the vibration of which is measured in the directions of respective axes are not same, so that strictly speaking, this is not the measurement of vibration in desired one point. Therefore, as a whole, there is a problem that the measured result of the object the vibration of which is measured is not obtained accurately.

Figure 4:
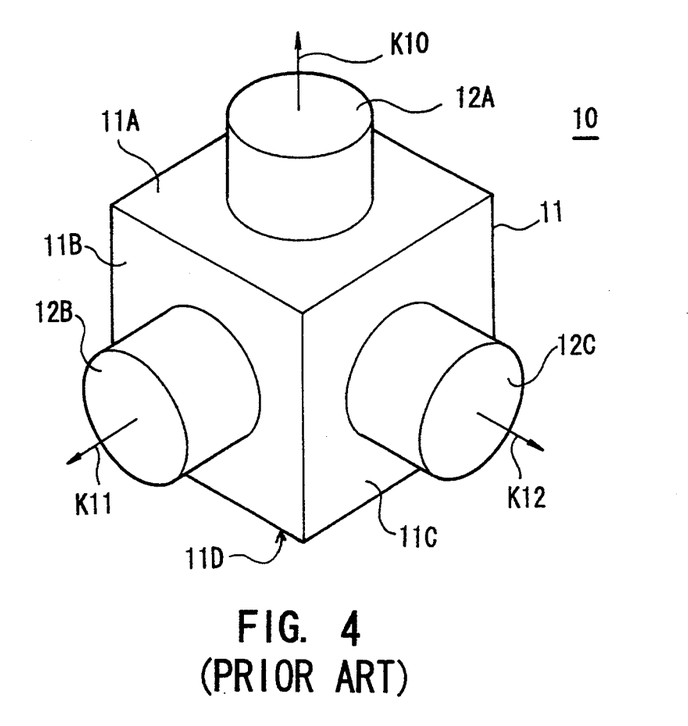
FIG. 4 is a schematically perspective view showing a conventional fixed type of three axial vibrometer.

As a means for solving this problem, heretofore, the fixed type of a three-axial vibrometer 10 having the construction shown in FIG. 4 has been proposed.

That is, the three-axial vibrometer 10 is composed of the vibration sensors 12A, 12B and 12C. The vibration sensors 12A, 12B and 12C are equipped on the side surfaces 11A, 11B and 11C which are next to each other of the vibration sensor mount block 11 formed to the rectangular parallelepipeds shape in order that the respective axes of measurement K10, K11 and K12 become perpendicular to the side surfaces 11A, 11B and 11C. The opposite side surface 11D of the surface 11A on which the vibration sensor 12A is equipped for measuring the vibration in Z-axis direction is fixed on the surface of the object the vibration of which is measured (not shown) with a bond or screws, so that the vibration in three axes directions, which are X-, Y- and Z-axis directions, can be detected at one point simultaneously.

However, in this type of the vibrometer 10, if the vibrometer is fixed on the surface the vibration of which is measured with screws, etc., since the contact spring constant is large with respect to the vibration in the direction (Z-axis direction) which is perpendicular to the surface the vibration of which is measured, the contact resonance frequency is high. Therefore, the frequency area in Z-axis direction which can be measured by the vibration sensor 12A expands. On the contrary, the frequency area in X-axis and Y-axis directions which can be measured by the vibration sensors 12B and 12C becomes narrow, since the contact spring constant is small with respect to the vibration in the directions (X-axis and Y-axis directions) which are parallel to the surface the vibration of which is measured, the contact resonance frequency becomes low in comparison with the contact spring constant in Z-axis direction. Therefore, the frequency area in X-axis and Y-axis directions which can be measured by the vibration sensors 12B and 12C becomes narrow. Hence, in this type of the vibrometer 10, there is a problem that the frequency area in the X-axis and Y-axis directions obtained as a measured result becomes only about 1/5 of the frequency area in the Z-axis direction.

Moreover, if the conventional fixed type of the three-axis vibrometer 10 is hand-held on the object the vibration of which is measured to measure the vibration, the measurable frequency area in the X-axis and Y-axis directions becomes further narrow, in comparison with the case where the vibrometer 10 is fixed by screws, etc. on the surface the vibration of which is measured.

Furthermore, a vibrometer (not shown) can be conceived in which a probe is set on the conventional three-axis vibrometer 10, and the vibration is measured by hand-holding the end of probe of this vibrometer on the object the vibration which is measured while the vibrometer is hand-held by operator. However, the end of probe is formed into a sphere surface and contacts with the surface the vibration of which is measured in the state of almost dot contact, so that, in comparison with the case where the three-axis vibrometer 10 in FIG. 4. is used by being hand-held, the contact spring constant in X-axis and Y-axis directions become small value. Therefore, the flat frequency characteristics is not obtained till the frequency area of more than 2 [kHz] which is needed in the failure check so that the hand-held type of three-axis vibrometer has not been realized for practical use.

SUMMARY OF THE INVENTION

In view of the foregoing, an object of this invention is to provide a vibrometer which can measure the quantity of vibration in three directions being perpendicular to each other at one point simultaneously, and at the same time, makes it possible to expand the contact resonance frequency at this time to high frequency area.

The foregoing object and other objects of the invention have been achieved by the provision of a vibrometer which is used by being hand-held on the surface of object the vibration of which is measured, which comprises: axes of measurement K30 to K32 and K33 to K36 in each direction; a plurality of vibration sensors 32A to 32C, 32D to 32G for detecting the quantity of vibration in respective directions of axes of measurement K30 to K32, K33 to K36 and for outputting them as detected signals S1 to S3, S10 to S13; a specific rigid body; a means for supporting vibration sensors 31 and 51 for fixing and supporting a plurality of vibration sensors 32A to 32C and 32D to 32G in order to intersect the respective specific center axes $M_2$ being centered at the same angle $\theta_2$ and in order that the axes of measurement K30 to K32, K33 to K36 intersect the center axis $M_2$ at one point $U_2$ on the surface of the hand-held portions 31A and 51A for hand-holding to the surface of the object the vibration of which is measured; and a calculating means 41A to 41C and 41D to 41F for calculating respectively the quantity of vibration of two- or three-axis directions which orthogonalize each other in the measurement position of the object the vibration of which is measured based on the detected signals S1 to S3 and S10 to S13.

A plurality of vibration sensors 32A to 32C and 32D to 32G are fixed and supported in order to intersect the respective specific center axes $M_2$ being centered at the same angle $\theta_2$ and in order that the axes of measurement K30 to K32 and K33 to K36 intersect the center axis $M_2$ at one point $U_2$ on the surface of the hand-held portions 31A and 51A for hand-holding to the surface of the object the vibration of which is measured. And at the same time, the quantity of vibration of two- or three-axis directions which orthogonalize each other in the position of object the vibration of which is measured are respectively calculated based on the detected signals S1 to S3 and S10 to S13. Therefore, respective vibration sensors 32A to 32C and 32D to 32G can detect the vibration containing the vibration components in two- or three-axis directions till the high contact resonance frequency with high contact spring constant. Thus, the quantity of vibration in two- or three-axis directions which are perpendicular to each other in the position the vibration of which is measured, and it can be actualized to provide a vibrometer which enables to expand the contact resonance frequency f1 at this time to the high frequency area.

According to the present invention, in the vibrometer which is used by hand-holding on the surface of object the vibration of which is measured, a plurality of the vibration sensors are fixed at the same angle with the specific center axis being centered and are fixed such that each axis of measurement intersects the center axis at one point on the surface of hand-hold part, and at the same time, the vibrating quantity of two or three axis directions at the measurement point of the object the vibration of which is measured is calculated based on the output from the each vibration sensor, so that each vibration sensor can detect the vibrating quantity of the vibration elements of two or three axis directions with high contact spring constant. Therefore, the vibrating quantity of two or three axis directions in perpendicular with each other at the vibration measurement position can be measured at one point simultaneously, and the vibrometer which raise the contact resonance frequency at this time up to the high frequency area.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Operation Principle

In general, when a bar whose sharp top end is perpendicularly hand-held on the surface (hereinafter, referred to as "a parallel vibrating surface") vibrating in parallel direction, the top end of bar vibrates with the parallel vibrating surface. This movement is same as the movement that the top end of the bar which are contacted with the parallel vibrating surface vibrates with one point (hereinafter, referred to as "fulcrum") on the center axis being centered.

Figure 5A:
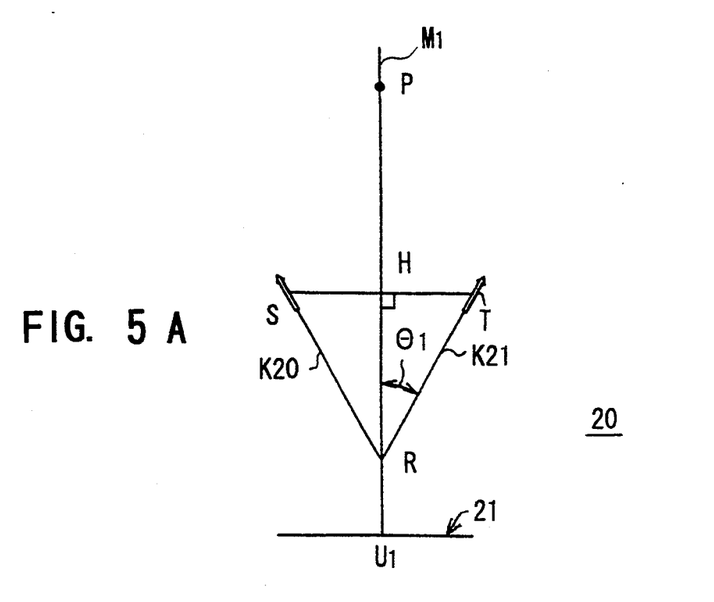
FIGS. 5A and 5B are schematic views for the explanation of the operation principle of the present invention.

Here, as shown in FIG. 5A, the vibration pick up 20 is considered in which a first and second vibration sensor elements (not shown) are set on the "S" point and "T" point positioning in linear symmetry with the center axis $M_1$ of the bar (not shown) being centered, in order to vibrate with the bar and in order that each axes of measurement K20 and K21 intersect at one specific point R on the center axis $M_1$.

Figure 5B:
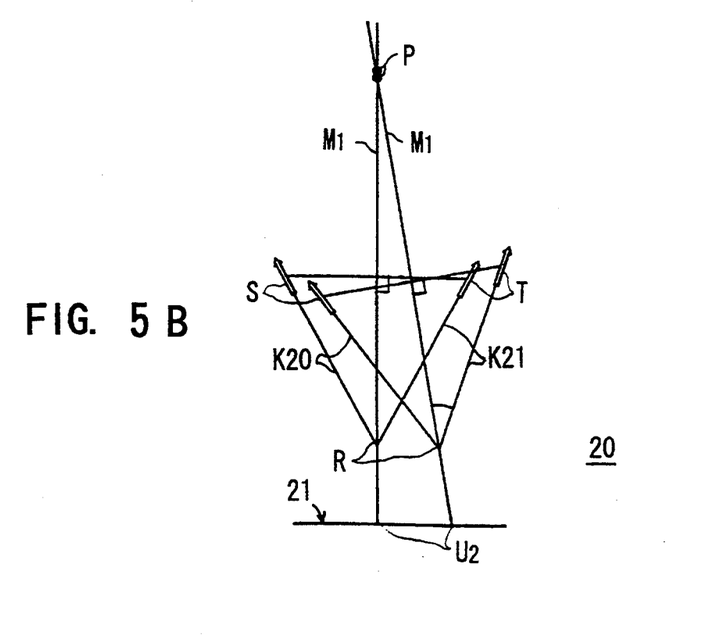

When the top end point $U_1$ of the vibration pick up 20 is perpendicularly hand-held on the parallel vibrating surface 21, the first and second vibration sensor elements vibrate in the parallel direction by the vibration (hereinafter, referred to as "direct vibration") received from the parallel vibrating surface 21 through the bar. At the same time, the bar moves with one specific point P on the center axis $M_1$ as the fulcrum, so that the first and second vibrating sensor elements, as shown in FIG. 5B, perform so-called rocking movement with the intersection point H which the straight line passing through "S" point and "T" point cross the center axis $M_1$ of the bar being centered.

At this time, the direct vibration, that the first and second vibrating sensor elements are received from the parallel vibrating surface 21, and the vibration based on the rocking movement (hereinafter, referred to as "a rocking vibration") are in the same phase. Therefore, the output based on the direct vibration and the output based on the rocking vibration are compounded and outputted from the first and second vibrating sensor elements.

Figure 6:
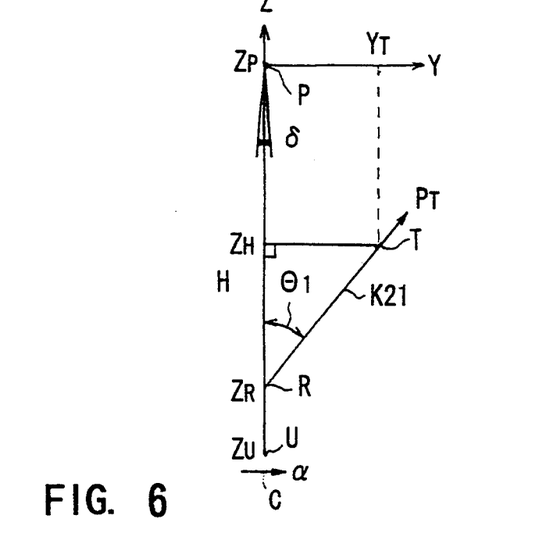
FIG. 6 is a schematic view for the explanation of the operation principle of the present invention.

Here, as shown in FIG. 6, as the fulcrum P of the bar is an origin, the straight line passing through the fulcrum P and the top end point $U_1$ is Z axis, and the straight line, which is orthogonal with Z axis and is in parallel with the line passing through the "S" point and "T" point, is a Y axis. And at this time, the Z-coordinates of the intersection point "H", the point "R", and the top end $U_1$ are respectively $Z_H$, $Z_R$, and $Z_U$, and the Y-coordinates of the point "T" is $Y_T$.

At this time, if the top end point $U_1$ of the vibration pick up 20 vibrates with the acceleration $\alpha$ in the direction parallel with the Y axis shown in the arrow c, the second vibration sensor element set in the point "T" detects the vibration in the Y- and Z-axis directions simultaneously.

In this case, the output $P_T$ of the second vibration sensor element is given by the following formula:

$$P_T = y \times \sin\theta_1 + z \times \cos\theta_1 \qquad (1)$$

where the vibrating quantity in the parallel direction of the second vibration sensor element is "y", the vibrating quantity in the perpendicular direction is "z", and an angle (hereinafter, referred to as "intersection angle"), formed by the axis of measurement K21 of the second vibration sensor element with the center axis $M_1$ of the bar, is $\theta_1$.

At this time, when the top end point $U_1$ of the vibration pick up 20 moves in Y-axis direction with the acceleration $\alpha$, and the deviation angle of the fulcrum P is $\delta$, and then the equation:

$$\sin\delta = \frac{a}{Z_U} \quad (2)$$

is given, and therefore, the vibrating quantity "y" in the parallel direction of the second sensor element and the vibrating quantity "z" in the perpendicular direction are respectively given by following formulas:

$$y = Z_H \times \sin\delta \quad (3)$$

$$z = Y_T \times \sin\delta \quad (4)$$

Therefore, formula (3) and formula (4) are substituted for "y" and "z" in formula (1), so that the output $P_T$ of the second vibration sensor element can be changed into the formula:

$$P_T = (Z_H \times \sin\theta_1 + Y_T \times \cos\theta_1) \times \sin\delta \quad (5)$$

At this time, using the Z-coordinates $Z_R$ of the point "R", the Z-coordinates $Z_H$ of the intersection point "H" is indicated by the following formula:

$$Z_H = Z_R - Y_T \times \frac{\cos\theta_1}{\sin\theta_1} \quad (6)$$

Therefore, the formula (6) is substituted for the formula (5) so that the output $P_T$ of the second vibration sensor element can be rewritten to the formula:

$$P_T = Z_R \times \sin\theta_1 \times \sin\delta \quad (7)$$

Moreover, the formula (7) is substituted for the formula (2) so that the formula (7) can be changed into the formula:

$$P_T = a \times \frac{Z_R}{Z_U} \times \sin\theta_1 \quad (8)$$

Here, it is apparent in the formula (8) that the output $P_T$ of the second vibration sensor element depends on the intersection angle $\theta_1$ of the axis of measurement K21 of the second vibration element and the center axis $M_1$ (that is, the perpendicular line on the parallel vibrating surface) and depends on the position of the fulcrum P.

At this time, although the intersection angle $\theta_1$ can be adjusted mechanically, in wide range of frequency, the fulcrum P can not be fixed in one point at all time.

However, as shown in the formula:

$$Z_R = Z_U \quad (9)$$

when the intersection point "R" of the axis of measurement K21 of the second vibration sensor element and the center axis $M_1$ of the bar is arranged to match with the top end point $U_1$ of the vibration pick up 21, as the output $P_T$ is indicated in the following formula:

$$P_T = a \times \sin\theta_1 \quad (10)$$

the second vibration sensor element does not depend on the position of the fulcrum P, and as a result, it shows the same output as the output in the case that the vibrometer is set in the top end point $U_1$.

In this case, regarding the outputs of the first and second vibration sensor elements, since the parallel vibration is reversed phase and the direction being perpendicular with the parallel vibrating surface 21 is same phase, as a result, the vibrating quantity in parallel direction which is provided into the first and second vibration sensor elements can be detected by obtaining the differential of the outputs of the first and second vibration sensor elements, and the vibrating quantity in perpendicular direction with the parallel vibrating surface 21 which is provided into the first and second vibration sensor elements can be detected by obtaining the sum of the outputs of the first and second vibration sensor elements.

(2) First Embodiment

Figure 7:
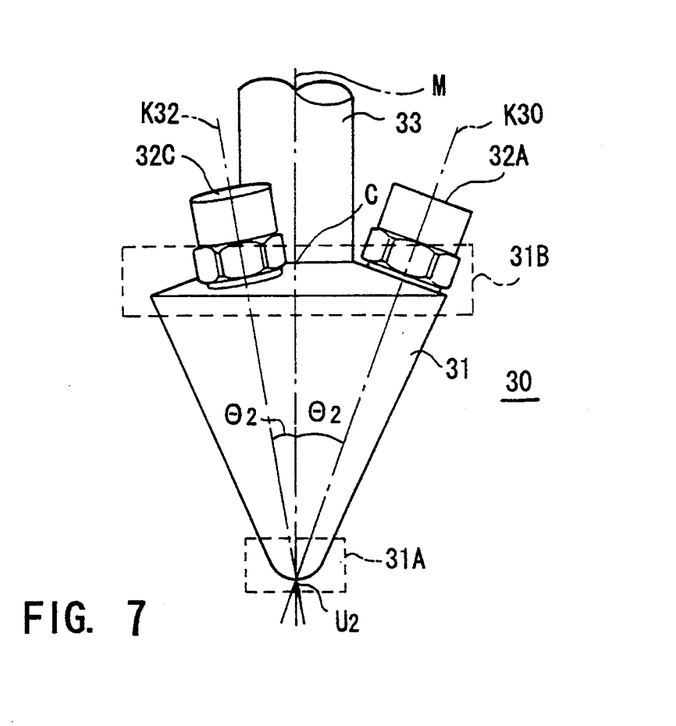
FIG. 7 is a side view showing a first embodiment of three-axial accelerometer according to the present invention.

In FIG. 7, 30 indicates a general three-axial accelerometer, and an acceleration sensor mount block 31 is generally shaped into almost cone shape using a rigid body materials like a metal, and is shaped into spherical shape in its top part 31A.

Figure 8:
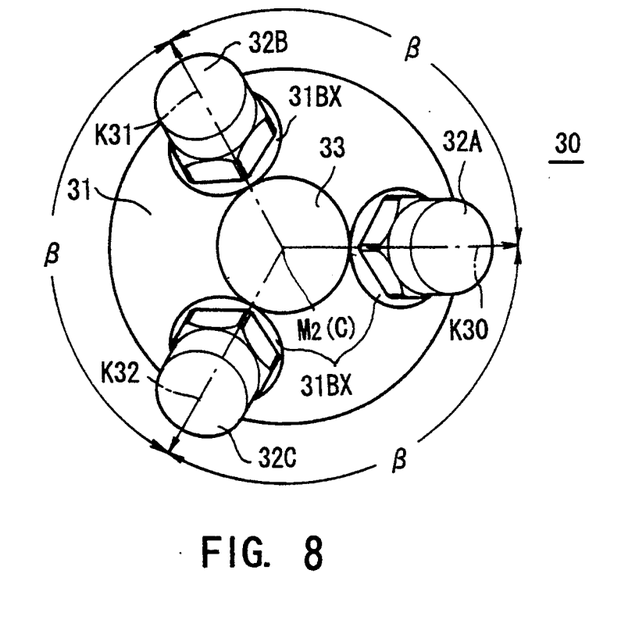
FIG. 8 is a top plane view of the three-axial accelerometer in FIG. 7.

The bottom part 31B of the acceleration sensor mount block 31, as shown in FIGS. 7 and 8, is shaped into almost cone trapezoidal shape with slight height except for the mount part 31BX of first to third acceleration sensors 32A to 32C shaped into planar shape, and on the upper surface, a handle 33 like a bar is placed such that the extended line from the center axis $M_2$ of the handle passes through the top end $U_2$ of the top part 31A (hereinafter, referred to as "vibration measurement point") and the upper center point C of the bottom surface part 31B.

In this case, the acceleration sensors 32A to 32C are constituted using piezo-electric elements, and respective acceleration sensors 32A to 32C are arranged, such that the axes of measurement K30 to K32 intersect the extended line of the center axis $M_2$ of the handle 33 at the vibration measurement point $U_2$, with the predetermined same angle $\theta_2$ which is the equiangle $\beta[°]$ ($\beta = 120$ [°]) respectively.

With this arrangement, in the three-axial accelerometer 30, the vibration measurement point $U_2$ is hand-held on the surface of the object the vibration of which is measured (not shown) so that the vibrating quantity in the position, where the vibration measurement point $U_2$ is hand-held, within the vibration measuring surface can be measured.

In this case, in the three-axial accelerometer 30, when the vibration measurement point $U_2$ is hand-held such that the extended line of the center axis $M_2$ of the handle 33 faces to the direction (Z-axis direction) being perpendicular to the surface of object the vibration of which is measured, in the case where the vibrating surface contacting with the vibration measurement point $U_2$, as the direction extending from Z-axis to the center position of the first acceleration sensor 32A is Y-axis, vibrates to the respective directions X-axis, Y-axis, and Z-axis with the acceleration showing in the formulas:

$$X = x \times \sin(\omega_x \times t) \quad (11)$$

$$Y = y \times \sin(\omega_y \times t) \quad (12)$$

$$Z = z \times \sin(\omega_z \times t) \quad (13)$$

the first to third acceleration sensors 32A to 32C detect the vibrating quantity indicated by the formulas:

$$A_x = 0 \tag{14}$$

$$\begin{aligned} B_x &= -x \times \sin(\omega_x \times t) \times \cos\left(\beta - \frac{\pi}{2}\right) \times \sin(\theta_2) \\ &= -x \times \sin(\omega_x \times t) \times \sin(\beta) \times \sin(\theta_2) \end{aligned} \tag{15}$$

$$C_x = x \times \sin(\omega_x \times t) \times \sin(\beta) \times \sin(\theta_2) \tag{16}$$

for the vibration in the X-axis direction.

Further, the first to third acceleration sensors 32A to 32C detect the vibrating quantity indicated by the formulas:

$$A_y = y \times \sin(\omega_y \times t) \times \sin(\theta_2) \tag{17}$$

$$\begin{aligned} B_y &= -y \times \sin(\omega_y \times t) \times \cos(\pi - \beta) \times \sin(\theta_2) \\ &= y \times \sin(\omega_y \times t) \times \cos(\beta) \times \sin(\theta_2) \end{aligned} \tag{18}$$

$$C_y = y \times \sin(\omega_y \times t) \times \cos(\beta) \times \sin(\theta_2) \tag{19}$$

for the vibration in the Y-axis direction, and furthermore, detect the vibrating quantity indicated by the formulas:

$$A_z = z \times \sin(\omega_z \times t) \times \cos(\theta_2) \tag{20}$$

$$B_z = z \times \sin(\omega_z \times t) \times \cos(\theta_2) \tag{21}$$

$$C_z = z \times \sin(\omega_z \times t) \times \cos(\theta_2) \tag{22}$$

for the vibration in the Z-axis direction.

Therefore, the first to third acceleration sensors 32A to 32C detect the vibration as a whole indicated by the formulas:

$$\begin{aligned} A_s &= A_x + A_y + A_z \\ &= 0 + y \times \sin(\omega_y \times t) \times \sin(\theta_2) + \\ &\quad z \times \sin(\omega_z \times t) \times \cos(\theta_2) \end{aligned} \tag{23}$$

$$\begin{aligned} B_s &= B_x + B_y + B_z \\ &= -x \times \sin(\omega_x \times t) \times \sin(\beta) \times \sin(\theta_2) + \\ &\quad y \times \sin(\omega_y \times t) \times \cos(\beta) \times \sin(\theta_2) + \\ &\quad z \times \sin(\omega_z \times t) \times \cos(\theta_2) \end{aligned} \tag{24}$$

$$\begin{aligned} C_s &= C_x + C_y + C_z \\ &= x \times \sin(\omega_x \times t) \times \sin(\beta) \times \sin(\theta_2) + \\ &\quad y \times \sin(\omega_y \times t) \times \cos(\beta) \times \sin(\theta_2) + \\ &\quad z \times \sin(\omega_z \times t) \times \cos(\theta_2) \end{aligned} \tag{25}$$

from the contacting measurement surface of vibration measurement point $U_2$ in accordance with the formulas (11) to (22).

Figure 9:
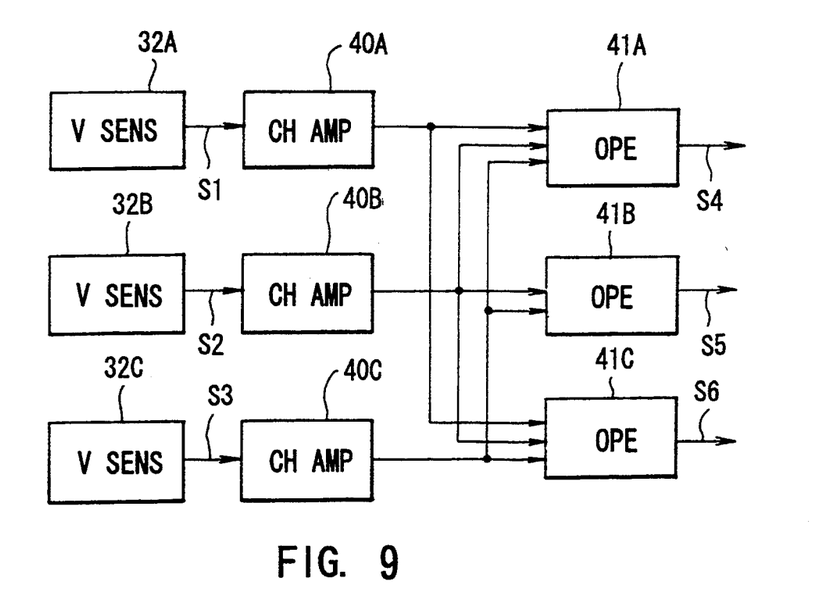
FIG. 9 is a block diagram showing the signal processing circuit of the three-axial accelerometer in FIG. 7.

In this case, as shown in FIG. 9, the first acceleration sensor 32A transforms the detected result into a detecting signal S1, and supplies it to the first to third operation circuits 41A and 41C via a charge amplifier circuit 40A, while the second and third acceleration sensors 32B and 32C transform the detected result into the detected signals S2 and S3, and supply them to the all first to third operation circuits 41A to 41C via the charge amplifier circuits 41B and 40C.

At this time, by using the approximate value in formula:

$$\sin\frac{2\pi}{3} = \frac{\sqrt{3}}{2} \approx \frac{1.732}{2} \tag{26}$$

and the formula:

$$\cos\frac{2\pi}{3} = -\frac{1}{2}, \tag{27}$$

when 120 [°] is substituted into $\beta$ in formulas (23) (24) and (25), the unnecessary term is canceled as shown in formula:

$$\begin{aligned} C_s - B_s &= 2x \times \sin(\omega_x \times t) \times \sin(\beta) \times \sin(\theta_2) \\ &= 1.732x \times \sin(\omega_x \times t) \times \sin(\theta_2) \end{aligned} \tag{28}$$

$$\begin{aligned} A_s - \frac{B_s}{2} - \frac{C_s}{2} &= y \times \sin(\omega_y \times t) \times \\ &\quad \{1 - \cos(\beta)\} \times \sin(\theta_2) \\ &= 1.5y \times \sin(\omega_y \times t) \times \sin(\theta_2) \end{aligned} \tag{29}$$

$$\begin{aligned} A_s + B_s + C_s &= y \times \sin(\omega_y \times t) \times \\ &\quad \{1 + 2\cos(\beta)\} \times \sin(\theta_2) + \\ &\quad 3z \times \sin(\omega_z \times t) \times \cos(\theta_2) \\ &= 3z \times \sin(\omega_z \times t) \times \cos(\theta_2) \end{aligned} \tag{30}$$

and the equation, which includes only the formula indicating the vibration of the X-axis, Y-axis, and Z-axis direction as unknown, can be led.

Therefore, the each vibration of X-axis, Y-axis, and Z-axis in the point on the vibration measurement surface contacting vibration measurement point $U_2$ of the three-axial accelerometer 30 can be obtained by the formulas:

$$x \times \sin(\omega_x \times t) = \frac{1}{1.732} \times (C_s - B_s) \times \frac{1}{\sin(\theta_2)} \tag{31}$$

$$y \times \sin(\omega_y \times t) = \frac{1}{3} \times (2A_s - B_s - C_s) \times \frac{1}{\sin(\theta_2)} \tag{32}$$

$$z \times \sin(\omega_z \times t) = \frac{1}{3} \times (A_s + B_s + C_s) \times \frac{1}{\cos(\theta_2)} \tag{33}$$

in which the formulas (28), (29), and (30) are calculated as the formulas showing the vibration in the directions X-axis, Y-axis, and Z-axis respectively.

In this way, the operation circuits 41A to 41C obtains the vibrating quantity of the X-axis and Y-axis directions and the vibrating quantity of the Z-axis direction in accordance with operation formulas (31), (32), and (33) based on the detected signals S1 to S3, and the calculated result is amplified and outputted as operating signals S4 to S6.

In this embodiment, the angle which the axes of measurement K30 to K32 of the acceleration sensors 32A to 32C intersect the extended line from the center axis $M_2$ of the handle 33 at the vibration measurement point $U_2$ is set to the angle of about 10° to 45 [°] in accordance with the data of experiment.

In the above constitution, in the three-axial accelerometer 30, the vibration measurement point $U_2$ of the acceleration sensor mount block 31 is hand-held on the surface of object the vibration of which is measured, so that the vibration acceleration on the vibrating surface is detected by each acceleration sensors 32A to 32C. And then, these are supplied into the predetermined operation circuits 41A to 41C as the detected signals S1 to S3.

Each operation circuit 41A to 41C executes the specific operating process based on the detected signals S1 to S3. Hence, the vibrating quantity of X-axis, Y-axis, and Z-axis directions at the position, where the vibrating measurement point $U_2$ is hand-held, is calculated among the surface of object the vibration of which is measured.

Figure 10:
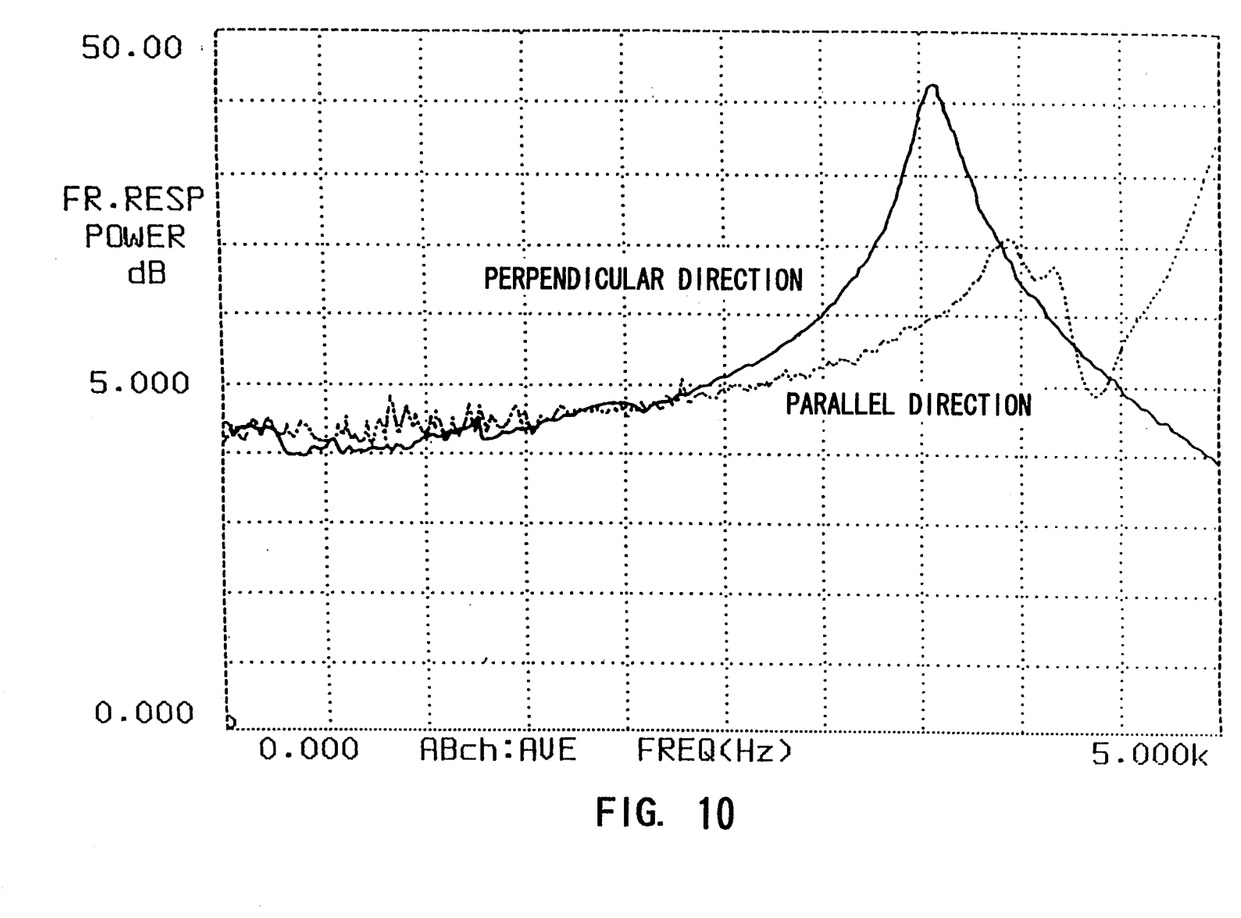
FIG. 10 is a characteristic curve diagram showing the contact resonance frequency of perpendicular and parallel directions of the three-axial accelerometer according to the embodiment.
Figure 11:
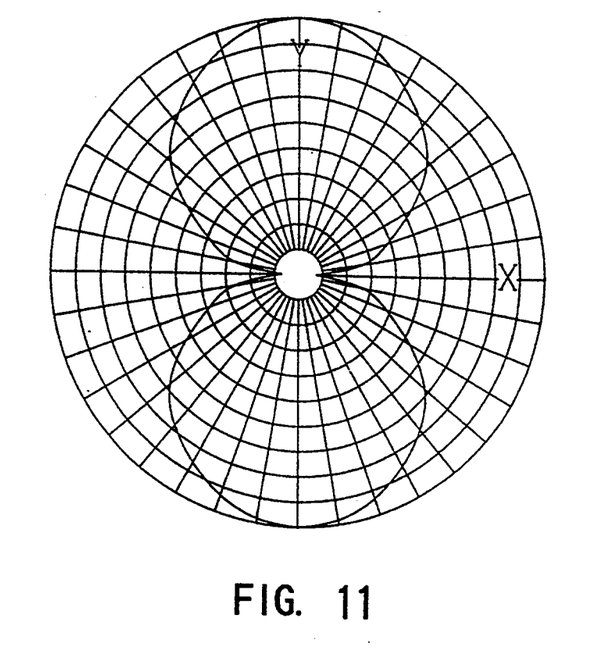
FIG. 11 is a characteristic curve diagram showing the directivity of parallel direction of the three-axis accelerometer according to the embodiment.

Here, FIG. 10 shows the frequency characteristic of the perpendicular and parallel direction of respective acceleration sensors 32A to 32C in the embodiment. FIG. 11 shows the directivity of the Y-axis direction of respective acceleration sensors 32A to 32C.

Usually, there is a contact resonance frequency as one of the important element of the vibration pick up, for example, in the acceleration type of the vibration pick up, $\frac{1}{3}$ of the frequency of the contact resonance frequency is used to the data for measuring as the flat area as described above. Therefore, the higher the frequency is, the wider the area for measuring becomes.

In this case, the contact resonance frequency is determined in accordance with the mass and the contact spring constant. In the fixed type of the three-axial vibrometer 10 whose respective axes of measurement K10 to K12 are orthogonalized each other as shown in FIG. 4, for example, there is the problem that the contact resonance frequency of the parallel direction is about 1/5 of the contact resonance frequency of the perpendicular direction since the contact spring constant of the parallel direction is smaller than the contact spring constant of the perpendicular direction.

However, in the three-axial accelerometer 30 of the embodiment, it can be confirmed that the contact resonance frequency of the parallel direction becomes higher than the contact resonance frequency of the perpendicular direction, and this is clear from that the contact resonance frequency of the parallel direction becomes 5.3 [kHz] and the contact resonance frequency of the perpendicular direction becomes 3.5 [kHz].

It can be forecasted that this is because the contact spring constant of the parallel direction in the three-axial accelerometer 30 is small as same as that in the three-axial vibrometer 10, and moreover, the motive and effective mass becomes smaller, so that whole contact resonance frequency of the parallel direction becomes high.

As a matter of fact, in this type of three-axial accelerometer 30, although the whole acceleration sensor mount block 31 becomes motive mass in the perpendicular direction, however, it becomes the mass proportioned to the force which is required for inclining these in the parallel direction, so that the motive mass becomes apparently small value. The more the top end of the three-axial accelerometer becomes thin and long, the more this effect is remarkable. Therefore, making the top end of the three-axial accelerometer 30 thinner and longer can be made the apparent motive mass of the parallel direction smaller. Thus, it is thinkable that the contact resonance frequency of the parallel direction can be high.

According to the experiment, in the case where the conventional fixed type of the three-axial accelerometer 30 as shown in FIG. 4 is used by hand-holding on the surface of object the vibration of which is measured with the usual hand-holding force of several kilogram, the contact resonance frequency is in the significant low frequency area. On the contrary, it has been proved that, in the case where the three-axial accelerometer 30 is used with the hand-holding force of, for example, 1 [kg], the contact resonance frequency can be measured to the high frequency area which is enough for practical use.

With the above construction, the first to third acceleration sensors 32A to 32C are respectively placed on the inclined plane of the bottom part 31B of the acceleration sensor mount block 31 such as to intersect at the same interval of angle $\beta$ around the extended line of the center axis $M_2$ of the handle 33, and at the same intersection angle $\theta_2$ in both of the vibration measurement point $U_2$ and the extended line of the center axis $M_2$. At the same time, the operation circuits 41A to 41C calculate the vibrating quantity of X- and Y-axis directions which is parallel with the surface of the measurement object, and the vibrating quantity of Z-axis direction which is perpendicular with the surface of measurement object, in accordance with the operation formula shown in formulas (31), (32) and (33) based on the detected signals S1, S2 and/or S3 supplied from the respective acceleration sensors 32A to 32C. Thus, the first to third acceleration sensors 32A to 32C can detect the vibration including the vibration elements of the parallel and perpendicular directions at the vibration measurement point $U_2$ with high contact spring constant, and at the same time, the vibrating quantity of the three-axis directions can be calculated based on the detected signals S1 to S3 by canceling the unnecessary term in the formulas (28), (29) and (30). In this way, the hand-holding type of three-axial accelerometer can be realized in which the vibrating quantity of three-axis directions, which are orthogonalized with each other at the position for measuring the vibration, can be measured simultaneously at one point, and at the same time, the contact resonance frequency f1 in this time is raised up to the high frequency area.

Further, the vibration at one point can be measured for the three-axis directions so that the vibration in physically small area can be analyzed toward the three-axis directions.

Further, the vibration at one point can be measured simultaneously and easily for the three-axis directions so that the relative vibration of three axes can be measured. Thus, the three-dimensional motion can be obtained and the closer correlation between the vibration and the real state can be comprehended.

Further, the vibration at one point can be measured simultaneously and easily for three-axis directions so that the application fields of vibration measurement can be expanded in the future, for example, promoting the development of the vibrometer which indicate effectively three-dimensional vibrating state, and the development of apparatuses such like the apparatus for analyzing the frequency of oscillatory waveform with the maximum amplitude.

Furthermore, the vibration at one point can be measured simultaneously and easily for three-axis directions so that so-called modal analysis, that the vibration is analyzed by signal processing in computer and that is time-consuming analysis, can be measured faster.

Furthermore, the first to third acceleration sensors 32A to 32C detect the vibration on the surface of object the vibration of which are being measured, and output them to the operation circuits 41A to 41C as the detected signals S1 to S3 via the charge amplitude circuits 40A to 40C. At the same time, the operation circuits 41A to 41C calculate respectively the vibrating quantity of X-axis, Y-axis and Z-axis directions in accordance with the operation formula (31), (32) and (33) based on the detected signals S1 to S3. Thus, the desired vibrating quantity of three directions which are orthogonalized with each other at the vibration measurement point $U_2$ can be detected by adjusting the hand-holding angle for the measurement surface of the three-axial vibrometer 30.

In this case, the respective acceleration sensors 32A to 32C detect the vibration of the center axis $M_2$ direction of the handle 33 as the vibration of Z-axis direction, and detect the vibration to the direction, which pass through the vibration measurement point $U_2$ and which the first acceleration sensor 32A on the plane being perpendicular to Z axis are facing, as the vibration of Y-axis direction.

(3) Second Embodiment

Figure 12:
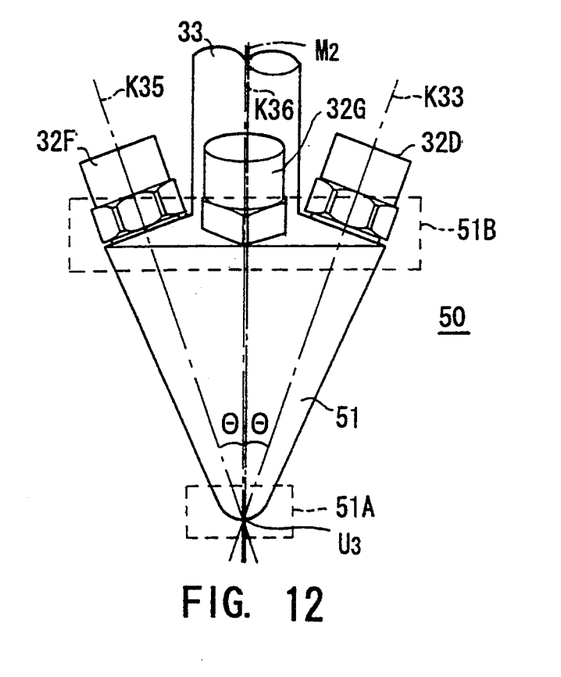
FIG. 12 is a side view showing a second embodiment of the three-axial accelerometer according to the present invention.
Figure 13:
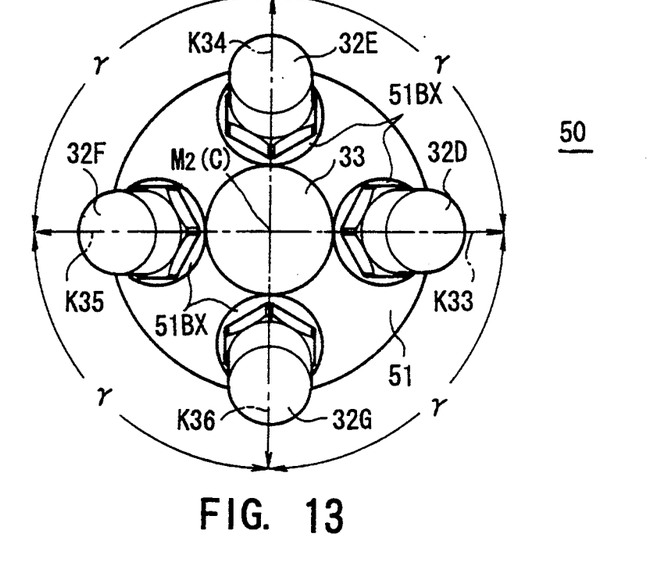
FIG. 13 is a top plane view of the three-axial accelerometer in FIG. 12.

FIGS. 12 and 13, wherein the portions corresponding to those in FIGS. 3 and 4 are marked with the same reference numerals or characters, indicate a three axial accelerometer 50 according to the second embodiment of the present invention. The acceleration sensor mount block 51 has mostly the same appearance with the acceleration sensor mount block 31 of the three-axial accelerometer 30 described above in FIGS. 3 and 4 except for the arrangement state of the acceleration sensor 32D to 32G.

That is, in the three-axial accelerometer 50, as shown in FIG. 8, the same fourth to seventh acceleration sensor 32D to 32G with the first to third acceleration sensor 32A to 32C (FIGS. 3 and 4) are arranged to set to the acceleration sensor mount part 51BX of bottom part 51B of the acceleration sensor mount block 51 with the same interval of the angle Y (Y=90 [°]), in order that the axes of measurement K33 to K36, in the vibration measurement point $U_2$ of the top end of the top part 51A of the acceleration sensor mount block 51, intersect the extended line of the center axis $M_2$ of the handle 33 at the same angle $\theta_2$.

Therefore, in the three-axial accelerometer 50, when the vibration measurement point $U_3$ is hand-held on the surface such that the center axis $M_2$ of the handle 33 becomes perpendicular with the surface of object (not shown) the vibration of which is measured, the direction running from the center axis $M_2$ to the center position of the fourth acceleration sensor 32D is Y-axis direction, and the direction running from the center axis $M_2$ to the center position of the fifth acceleration sensor 32E is X-axis. If the measurement plane contacting with the vibration measurement point $U_3$ vibrates to three direction, X-axis, Y-axis, and Z-axis directions such as to be shown by the formulas (11), (12), and (13) respectively, the fourth to seventh acceleration sensors 32D to 32G detect the vibration component of vibrating quantity shown in the formulas:

$$D_x = 0 \qquad (34)$$

$$E_x = -x \times \sin(\omega_x \times t) \times \sin(\theta_2) \qquad (35)$$

$$F_x = 0 \qquad (36)$$

$$G_x = x \times \sin(\omega_x \times t) \times \sin(\theta_2) \qquad (37)$$

for the vibration of X-axis direction.

Further, the fourth to seventh acceleration sensors 32D to 32G detect the vibration components of the vibrating quantity shown in the formulas:

$$D_y = y \times \sin(\omega_y \times t) \times \sin(\theta_2) \qquad (38)$$

$$E_y = 0 \qquad (39)$$

$$F_y = -y \times \sin(\omega_y \times t) \times \sin(\theta_2) \qquad (40)$$

$$G_y = 0 \qquad (41)$$

for the vibration of Y-axis direction, and further detect the vibration components of the vibrating quantity shown in the formulas:

$$D_z = z \times \sin(\omega_z \times t) \times \cos(\theta_2) \qquad (42)$$

$$E_z = z \times \sin(\omega_z \times t) \times \cos(\theta_2) \qquad (43)$$

$$F_z = z \times \sin(\omega_z \times t) \times \cos(\theta_2) \qquad (44)$$

$$G_z = z \times \sin(\omega_z \times t) \times \cos(\theta_2) \qquad (45)$$

for the vibration of Z-axis direction.

Therefore, the fourth to seventh acceleration sensors 32D to 32G, using the formulas (34) to (45), detect the vibration shown by the formulas:

$$\begin{aligned} D_s &= D_x + D_y + D_z \\ &= 0 + y \times \sin(\omega_y \times t) \times \sin(\theta_2) + \\ &\quad z \times \sin(\omega_z \times t) \times \cos(\theta_2) \end{aligned} \qquad (46)$$

$$\begin{aligned} E_s &= E_x + E_y + E_z \\ &= -x \times \sin(\omega_x \times t) \times \sin(\theta_2) + \\ &\quad 0 + z \times \sin(\omega_z \times t) \times \cos(\theta_2) \end{aligned} \qquad (47)$$

$$\begin{aligned} F_s &= F_x + F_y + F_z \\ &= 0 - y \times \sin(\omega_y \times t) \times \sin(\theta_2) + \\ &\quad z \times \sin(\omega_z \times t) \times \cos(\theta_2) \end{aligned} \qquad (48)$$

$$\begin{aligned} G_s &= G_x + G_y + G_z \\ &= x \times \sin(\omega_x \times t) \times \sin(\theta_2) + \\ &\quad 0 + z \times \sin(\omega_z \times t) \times \cos(\theta_2) \end{aligned} \qquad (49)$$

as a whole, from the contacted vibration plane contacting at the vibration measurement point $U_3$.

Figure 14:
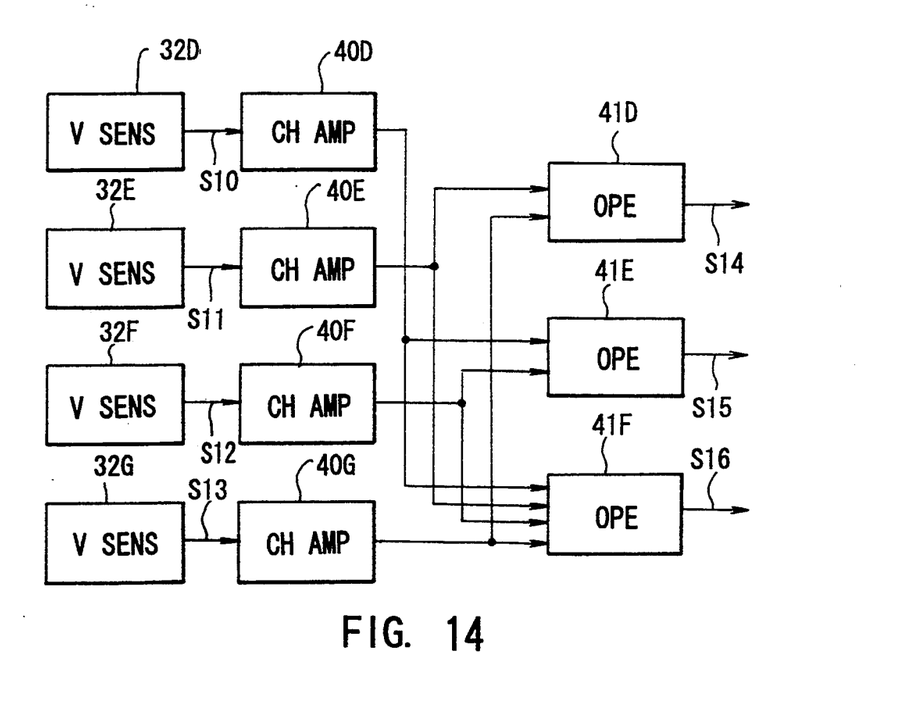
FIG. 14 is a block diagram showing the signal processing circuit of the three-axial accelerometer in FIG. 12.

Here, as shown in FIG. 14, the fourth and sixth acceleration sensors 32D and 32F convert the detected result into detected signals S10 and S12, and then output them to the second and third operation circuits 41E and 41F via the charge amplitude circuits 40D or 40F respectively, while the fifth and seventh acceleration sensors 32E and 32G convert the detected result into the detected signals S11 and S13 to output to the first and third operation circuits 41D and 41F via the charge amplitude circuits 40E and 40G respectively.

In this case, as shown in the formulas:

$$G_s - E_s = 2x \times \sin(\omega_x \times t) \times \sin(\theta_2) \qquad (50)$$

$$D_s - F_s = 2y \times \sin(\omega_y \times t) \times \sin(\theta_2) \qquad (51)$$

$$D_s + E_s + F_s + G_s = 4z \times \sin(\omega_z \times t) \times \cos(\theta_2) \qquad (52)$$

the unnecessary term is canceled from the formulas (46), (47), (48) and (49), and the equation which includes only the formula representing the vibration of X-axis, Y-axis or Z-axis direction can be led as a unknown.

Therefore, the vibration of X-axis, Y-axis, and Z-axis directions at one point on the surface of object the vibration of which is measured contacting at the vibration measurement point $U_3$ of the accelerometer 50 are obtained by the formulas:

$$x \times \sin(\omega_x \times t) = \frac{1}{2} \times (G_s - E_s) \times \frac{1}{\sin(\theta_2)} \qquad (53)$$

$$y \times \sin(\omega_y \times t) = \frac{1}{2} \times (D_s - F_s) \times \frac{1}{\sin(\theta_2)} \qquad (54)$$

$$z \times \sin(\omega_z \times t) = \frac{1}{4} \times (D_s + E_s + F_s + G_s) \times \frac{1}{\cos(\theta_2)} \qquad (55)$$

which is calculated from the formulas (50), (51) and (52) as the formulas representing the vibration of X-axis, Y-axis, and Z-axis directions respectively.

In this way, the operation circuits 41D to 41F calculate the vibrating quantity of X-axis, Y-axis, and Z-axis directions in accordance with the operation formula shown in the formulas (53), (54) and (55) based on the detected signals S10, S11, S12 and/or S13 to output the calculated results as the operation signals S14 to S16.

In the above arrangement, in the three-axial accelerometer 50, the vibration measurement point $U_3$ of the acceleration sensor mount block 51 is hand-held on the surface of object the vibration of which is measured so that the respective acceleration sensors 32D to 32F detect the vibration acceleration of the measurement plane, and then supply them to the specific operation circuits 41D to 41F as the detected signals S10 to S13.

Respective operation circuits 41D to 41F perform the specific operation process based on the detected signals S10 to S13, thus the vibrating quantity of X-axis, Y-axis, and Z-axis directions at the position where the vibration measurement point $U_3$ is hand-held among the surface of object the vibration of which is measured.

With the above constitution, since the three-axial accelerometer 50 detect the vibrating quantity one by one using many acceleration sensors 32D to 32F or 32G regarding the vibration of X-axis, Y-axis, and Z-axis, the vibrometer can be realized in which the vibrating quantity of three-axis directions can be respectively measured with high accuracy significantly, in comparison with the three-axial accelerometer 30 of the first embodiment.

(4) Other Embodiments

The first and second embodiments discussed above have dealt with the case where the three-axial accelerometer 30 and 50 are used in this invention. However, this invention is not limited to this but a variety of vibrometer such like a displacement meter, a speed meter, etc. can be applied.

Further, the first and second embodiments discussed above have dealt with the case where the acceleration sensor mount blocks 31 and 51 are formed mostly to a cone-shape using the rigid body such like a metal. However, this invention is not limited to this but the other materials and shape can be used for the acceleration sensor mount blocks 31 and 51, if it has the specific rigidity and the respective acceleration sensors 32A to 32C or 32C to 32G can be kept to the specific state.

Further, the first and second embodiments discussed above have dealt with the case where a plurality of the acceleration sensors 32A to 32C or 32D to 32G are arranged to set on the inclined surface of the bottom part 31A or 51A in the acceleration sensor mount block 31 or 51, so that the distance between the respective acceleration sensors 32A to 32C or 32D to 32G and the vibration measurement point $U_2$ or $U_3$ are equalized. However, this invention is not limited to this but, if the angle of the axes of measurement K30 to K32 or K33 to K36 of respective acceleration sensors 32A to 32C or 32D to 32G with the extended line of the center axis $M_2$ of the handle 33 are equal, it is not necessary that the distance between the respective acceleration sensors 32A to 32C or 32D to 32G and the vibration measurement point $U_2$ or $U_3$ is equal. In this case, the three-axial vibrometer can obtain mostly the same efficiency with the first and second embodiments described above.

Further, the first and second embodiments discussed above have dealt with the case where the angle $\theta_2$, which the axes of measurement K30 to K32 or K33 to K36 of the respective acceleration sensors 32A to 32C or 32D to 32G intersect the extended line of the center axis $M_2$ of the handle 33 at the vibration measurement point $U_2$ or $U_3$, are selected to become about 10° to 45 [°]. However, this invention is not limited to this but the other angle except for this value may be selected as the angle $\theta_2$.

Furthermore, the first and second embodiments discussed above have dealt with the case where the vibration of three directions, that the three-axial accelerometer 30 and 50 are perpendicular each other, are detected. However, this invention is not limited to this but only the vibration quantity of one direction or two directions may be outputted among the vibrating quantity of three directions in perpendicular with each other. In this case, the vibrometer 30 or 50 can be used as the vibrometer for one axis or two axes.

Further, the first and second embodiments described above have dealt with the case where three or four acceleration sensors 32A to 32C or 32D to 32G are arranged to set on the inclined surface of the bottom part 31B or 51A in the acceleration sensor mount block 31 or 51. However, this invention is not limited to this but the number of the acceleration sensor set on the acceleration sensor mount block 31 or 51 is not limited to this and other number can be used, if the vibrating quantity of three-axis or two-axis directions can be detected respectively based on the detected signals S1 to S3 or S10 to S13 outputted from the acceleration sensor 32A to 32C or 32D to 32G.

Further, the first and second embodiments described above have dealt with the case where the each operation circuit 41A to 41C or 41D to 41G calculate the vibrating quantity of X-axis, Y-axis, and Z-axis on the surface of object the vibration of which is measured contacting by the vibration measurement point $U_2$ or $U_3$, in accordance with the operation formulas shown by the formulas (31), (32) and (33), or the formulas (53), (54) and (55). However, this invention is not limited to this but the other operation formulas can be used as the operation formula for detecting the vibrating quantity based on the formulas (23), (24) and (25), or the formulas (46), (47) and (48).

Further, the first and second embodiments described above have dealt with the case where the acceleration sensors 32A to 32C or 32D to 32G composed of the piezo-electric elements are used. However, this invention is not limited to this but the other type such like a strain vibration gauge or an optical vibration sensor can be used instead of the acceleration sensors 32A to 32C or 32D to 32G.

Further, the first and second embodiments described above have dealt with the case where the vibrating quantities of X-axis, Y-axis, and Z-axis directions are calculated using three operation circuits 41A to 41C or 41D to 41F. However, this invention is not limited to this but one or more operation circuits 41A to 41C or 41D to 41F may be used, if the vibrating quantity of three directions can be calculated respectively.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A vibrometer adapted for use as a hand-held device for measuring vibration at a surface of a vibrating object, comprising:
   a plurality of vibration sensors each having a respective axis of measurement in one direction for detecting an amount of vibration in the direction of said respective axis of measurement and for generating respective output signals representative of the respective detected amount of vibration in said direction;
   mounting means, formed of a rigid body adapted to be hand held with a contact point on a surface of said rigid body in contact with said surface of said vibrating object, for fixedly supporting said plurality of vibration sensors in respective orientations so that the respective axes of measurement of said vibration sensors all intersect at said contact point on said surface of said rigid body, said contact point being at a center axis of said mounting means, said respective axes of measurement of said vibration sensors intersecting said center axis at respective angles that are all equal to each other; and
   calculation means for calculating, on the basis of said output signals generated by said vibration sensors, an amount of vibration, at a measurement point that is on said surface of said vibrating object and is in contact with said contact point on said surface of said rigid body, and in respective directions in at least two measurement axes which pass through said measurement point on said surface of said vibrating object.

2. The vibrometer according to claim 1, wherein said rigid body of said mounting means is substantially cone-shaped, said substantially cone-shaped rigid body having a top portion which is spherically shaped, said contact point on said surface of said rigid body being at said spherically shaped top portion of said rigid body.

3. The vibrometer according to claim 2, wherein a bottom portion of said substantially cone-shaped rigid body of said mounting means is formed into a trapezoidal shape, and said plurality of vibration sensors are mounted on said trapezoidal-shaped bottom portion of said rigid body.

4. The vibrometer according to claim 3, further comprising a bar-shaped handle mounted on said trapezoidal-shaped bottom portion of said rigid body so that a center axis of said bar-shaped handle coincides with said center axis of said mounting means.

5. The vibrometer according to claim 3, wherein said mounting means is formed of metal.

6. The vibrometer according to claim 3, wherein said plurality of vibration sensors consists of three vibration sensors arranged around said center axis of said mounting means at equal intervals of 120°.

7. The vibrometer according to claim 3, wherein said plurality of vibration sensors consists of four vibration sensors arranged around said center axis of said mounting means at equal intervals of 90°.

8. The vibrometer according to claim 6, wherein said respective equal angles at which said respective axes of measurement of said plurality of vibration sensors intersect said center axis of said mounting means are within a range of about 10° to 45°.

9. The vibrometer according to claim 7, wherein said respective equal angles at which said respective axes of measurement of said plurality of vibration sensors intersect said center axis of said mounting means are within a range of about 10° to 45°.

10. The vibrometer according to claim 1, wherein there are no vibration sensors mounted on said mounting means other than said plurality of vibration sensors oriented with respective axes of measurement intersecting at said contact point on said surface of said rigid body of said mounting means.

11. The vibrometer according to claim 1, wherein said at least two measurement axes which pass through said measurement point include a first measurement axis which is normal to said surface of said vibrating object and second and third measurement axes which are parallel to said surface of said vibrating object and are orthogonal to each other.

12. The vibrometer according to claim 1, wherein said rigid body of said mounting means is substantially symmetrical about said center axis.

* * * * *